United States Patent
Yugou et al.

(10) Patent No.: US 10,658,853 B2
(45) Date of Patent: May 19, 2020

(54) POWER SUPPLY SYSTEM

(71) Applicant: SANYO Electric Co., Ltd., Daito-shi, Osaka (JP)

(72) Inventors: Masaki Yugou, Hyogo (JP); Masato Nishikawa, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 67 days.

(21) Appl. No.: 15/772,712

(22) PCT Filed: Oct. 26, 2016

(86) PCT No.: PCT/JP2016/004697
§ 371 (c)(1),
(2) Date: May 1, 2018

(87) PCT Pub. No.: WO2017/081846
PCT Pub. Date: May 18, 2017

(65) Prior Publication Data
US 2019/0181664 A1 Jun. 13, 2019

(30) Foreign Application Priority Data

Nov. 11, 2015 (JP) ................................ 2015-221292

(51) Int. Cl.
*H02J 7/00* (2006.01)
*H01M 2/34* (2006.01)
(Continued)

(52) U.S. Cl.
CPC .......... *H02J 7/0031* (2013.01); *B60L 3/0046* (2013.01); *B60L 58/18* (2019.02); *H01M 2/10* (2013.01);
(Continued)

(58) Field of Classification Search
CPC .... Y02E 60/12; G01R 31/3658; H02J 7/0021; H02J 7/0016; Y02T 10/7055
See application file for complete search history.

(56) References Cited

U.S. PATENT DOCUMENTS

2008/0157718 A1* 7/2008 Ohnuki ................. H02J 7/0021
320/134
2009/0295329 A1* 12/2009 Yugou ................... B60L 3/0046
320/116
(Continued)

FOREIGN PATENT DOCUMENTS

JP  2004-7919 A   1/2004
JP  2009-238644 A  10/2009
(Continued)

OTHER PUBLICATIONS

International Search Report dated Dec. 27, 2016, issued in counterpart International Application No. PCT/JP2016/004697 (1 page).

*Primary Examiner* — Arun C Williams
(74) *Attorney, Agent, or Firm* — Westerman, Hattori, Daniels & Adrian, LLP

(57) ABSTRACT

In order to reduce costs and increase safety with respect to the submergence of water in a power supply system, in this power supply system (1) a plurality of power storage modules (11)-(14) are connected in series. A fuse (F1) is inserted into the path in which the plurality of power storage modules (11)-(14) are serially connected, the fuse being inserted at a position dividing the plurality of power storage modules (11)-(14) into a first group and a second group. A positive-pole-side contactor (RY1) is inserted at a position dividing the plurality of power storage modules belonging to the first group into a first sub-group and a second sub-group. A negative-pole-side contactor (RY2) is inserted at a position
(Continued)

dividing the plurality of power storage modules belonging to the second group into a first sub-group and a second sub-group.

3 Claims, 4 Drawing Sheets

(51) Int. Cl.
  *H01M 10/44* (2006.01)
  *H02J 7/02* (2016.01)
  *H01M 2/20* (2006.01)
  *H01M 2/10* (2006.01)
  *B60L 58/18* (2019.01)
  *B60L 3/00* (2019.01)

(52) U.S. Cl.
  CPC ............ *H01M 2/1077* (2013.01); *H01M 2/20* (2013.01); *H01M 2/34* (2013.01); *H01M 10/44* (2013.01); *H02J 7/0021* (2013.01); *H02J 7/02* (2013.01)

(56) References Cited

U.S. PATENT DOCUMENTS

| 2010/0001737 | A1* | 1/2010 | Kubo | H02J 7/0013 324/434 |
| 2010/0072950 | A1* | 3/2010 | Tatebayashi | H02J 7/0021 320/134 |
| 2010/0127663 | A1* | 5/2010 | Furukawa | B60L 3/0046 320/134 |
| 2014/0300180 | A1 | 10/2014 | Iwashita et al. | |

FOREIGN PATENT DOCUMENTS

| JP | 2011-78174 A | 4/2011 |
| WO | 2013/084665 A1 | 6/2013 |

\* cited by examiner

A—A'

B—B'

POWER SUPPLY SYSTEM

TECHNICAL FIELD

The present invention relates to a power supply system including a plurality of power storage modules connected in series.

BACKGROUND ART

In recent years, hybrid vehicles (HV), plug-in hybrid vehicles (PHV), and electric vehicles (EV) are being spread. In the vehicle, the power supply system is installed, which includes a plurality of power storage modules connected in series for supplying a drive power to a running motor. When the running motor requires high voltage, the increase of the voltage of the power supply system is carried out by increasing the number of series-connected power storage modules.

In the power supply system installed in the vehicle, when the vehicle is submerged or immersed in water or the leakage of a liquid coolant for cooling happens, there is a possibility, that adjacent storage batteries are directly short-circuited to each other, or the storage batteries are short-circuited through a metal box. When the arc discharge happens in the high electric potential difference, there is a possibility that a hole is opened in the battery can due to the arc discharge, and there is a risk that the electrolyte or the like leaks, resulting in ignition.

CITATION LIST

Patent Literature

PTL 1: Unexamined Japanese Patent Publication No. 2009-238644

SUMMARY OF THE INVENTION

In order to enhance withstand voltage of the cell, it is effective that insulation distance is made long or a part having high specification is used. However, it results in enlargement of the power supply system, or cost increase.

The present invention Is made in light of such circumstances, and an object of the present invention is to provide a technique that reduces costs and increases safety with respect to the infiltration of water in a power supply system.

To solve the above-mentioned requirements, a power storage system of an exemplary embodiment of the present invention, comprising:

a plurality of power storage modules that are connected in series:

a fuse that is inserted into a path in which the plurality of power storage modules are serially connected, at a position dividing the plurality of power storage modules into a first group and a second group;

a positive-pole-side contactor that is inserted at a position dividing the plurality of power storage modules belonging to the first group into a first sub-group and a second sub-group; and a negative-pole-side contactor that is inserted at a position dividing the plurality of power storage modules belonging to the second group into a first sub-group and a second sub-group.

Any desired combinations of the above-described components and converted expressions of the present invention in methods, devices, systems, and other similar entities are still effective as aspects of the present invention.

According to the present invention, the power supply system can reduce costs and increase safety with respect to the submergence of water in a power supply system.

DESCRIPTION OF EMBODIMENTS

Figure 1:
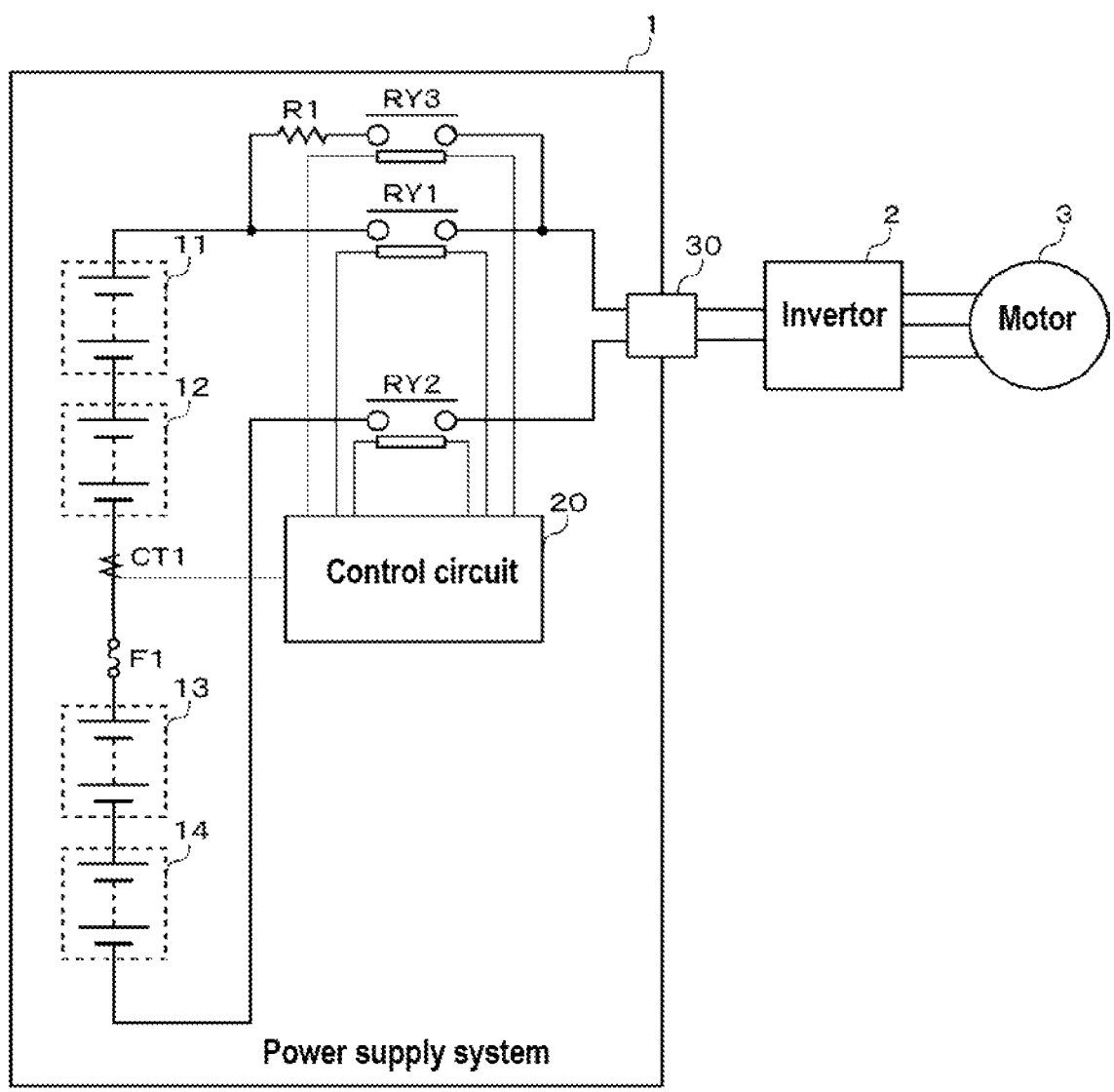
FIG. 1 is a view showing an example of a general circuit configuration of a power supply system for a vehicle.

FIG. 1 is a view showing an example of a general circuit configuration of power supply system 1 for a vehicle. Power supply system 1 is a power storage system which stores electric power supplied to motor 3. Power supply system 1 is provided in a vehicle, separately from a 12 V secondary battery for auxiliary machine (generally, a lead battery is used).

At the time of power running, inverter 2 converts DC power supplied from power supply system 1 into AC power to supply the converted AC power to motor 3. At the time of regeneration, inverter 2 converts AC power supplied from motor 3 into DC power to supply the converted DC power to power supply system 1. For example, a three-phase AC synchronous motor is used as motor 3. Hereinafter, in this specification, the motor using high voltage of 300 V or more is assumed. At the time of power running, motor 3 rotates, based on power supplied from inverter 2, to drive the vehicle. At the time of regeneration, motor 3 generates electric power, by the rotation based on deceleration energy of the vehicle, to charge power supply system 1 through inverter 2.

Power supply system 1 includes a plurality of power storage modules 11-14 connected in series, control circuit 20, connector 30, positive-pole-side contactor RY1, negative-pole-side contactor RY2, pre-charge resistor R1, pre-charge contactor RY3, current sensor CT1, and fuse F1. These are stored in the housing.

Each of power storage modules 11-14 includes a plurality of single cells connected in series. The single cell is configured of one piece of a single battery, or a plurality of single batteries connected in series. An example of the single cell includes any one of lithium ion battery cell, nickel hydride battery cell, and electric double-layer capacitor cell. Hereinafter, in this specification, it is assumed that the lithium ion battery cell (nominal voltage: 3.6-3.7V) is used and the number of the series connection is designed appropriately at 20 pieces. Further, it is assumed that 4 pieces of these power storage modules are connected in series.

Connecter 30 is an input and output terminal of a current of power supply system 1, having a high voltage specification. Connecter 30 has a terminal of a male or female type, which is fit to a connector at the tip of a wire harness which leads to inverter 2.

Positive-pole-side contactor RY1 is inserted between a plus wiring which leads to connector 30 and another plus wiring which leads to a positive terminal of power storage modules 11-14 (the positive terminal of first power storage module 11 in FIG. 1). Negative-pole-side contactor RY2 is inserted between a minus wiring which leads to connector 30 and another minus wiring which leads to a negative terminal of power storage modules 11-14 (the negative terminal of fourth power storage module 14 in FIG. 1).

A pre-charge circuit is connected in parallel to positive-pole-side contactor RY1. The pre-charge circuit has pre-charge resistor R1 and pre-charge contactor RY3 connected in series to this pre-charge resistor R1. A large relay switch can be used as positive-pole-side contactor RY1, negative-pole-side contactor RY2, or pre-charge contactor RY3.

Pre-charge contactor RY3 charges a pre-charge capacitor (not shown in figures), while pre-charge contactor RY3 and negative-pole-side contactor RY2 are closed before positive-pole-side contactor RY1 is closed. Then, positive-pole-side contactor RY1 is closed, and thereby power supply to motor 3 starts. A rush current can be controlled by this controlling procedure.

Current sensor CT1 and fuse F1 are inserted on a current path which connects 4 pieces of power storage modules 11-14 in series. Current sensor CT1 detects a value of a current flowing through this current path, and the current value is outputted to control circuit 20. A clamp type current sensor, a current sensor employing a shunt resistor, or a current sensor employing a Hall element or the like can be used as current sensor CT1. Fuse F1 is blown out by melting when a large current of more than a specified value flows, and cuts off this current path.

Control circuit 20 (this is also called a battery ECU) manages and controls the plurality of power storage modules 11-14. Control circuit 20 obtains a value of a current flowing through the plurality of power storage modules 11-14 connected in series, from current sensor CT1. Control circuit 20 also obtains a voltage value and a temperature value detected by a voltage sensor (not shown in figures) and a temperature sensor (not shown in figures) within each of power storage modules 11-14.

Control circuit 20 opens (turns off) positive-pole ide contactor RY1 and negative-pole-side contactor RY2, when an abnormality (for example, over-voltage, over-current), happens in at least one of the plurality of power storage modules 11-14, based on the obtained current value, voltage value, and temperature value.

Figure 2:
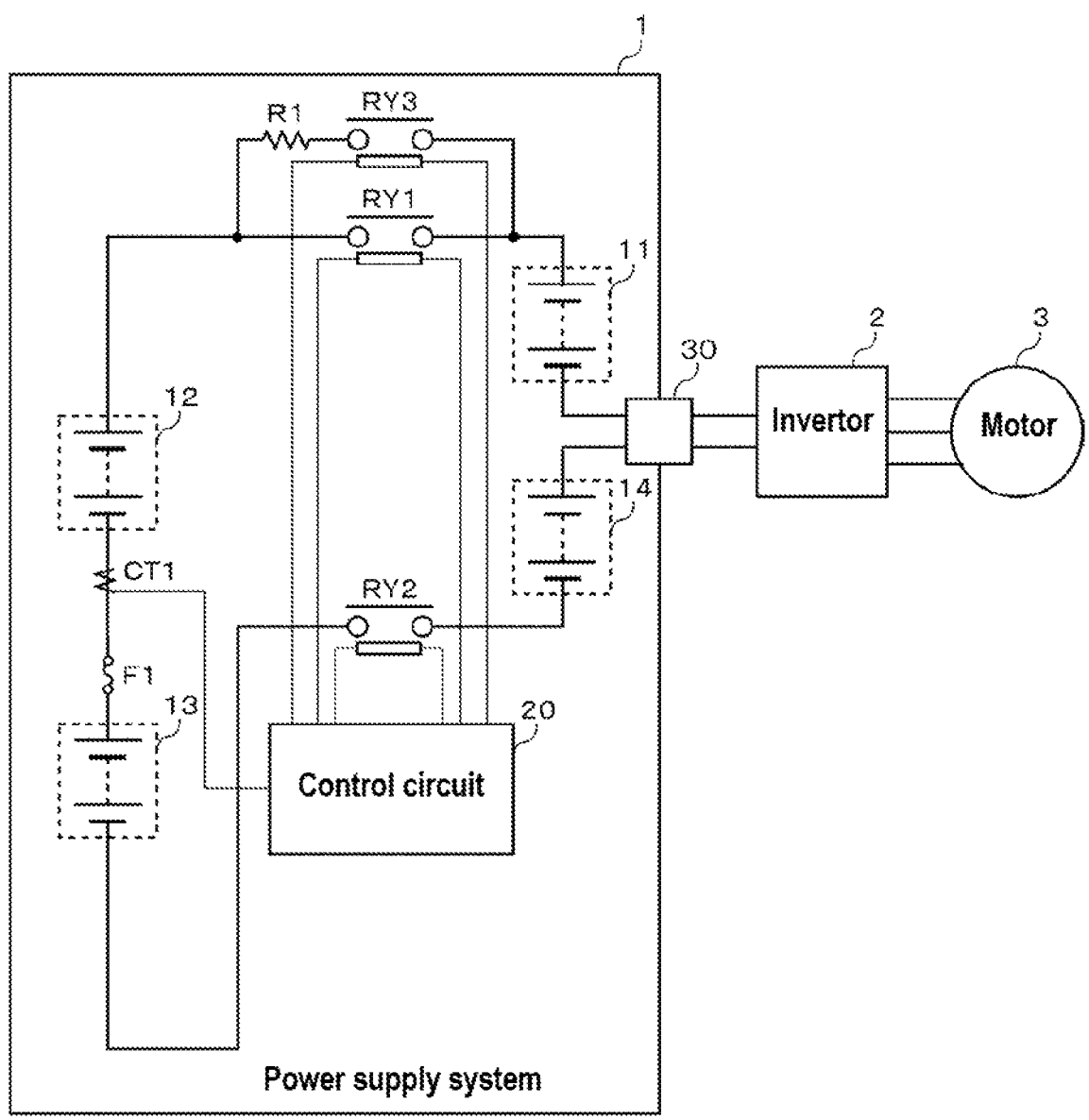
FIG. 2 is a view showing an example of a circuit configuration of a power supply system for a vehicle according to an exemplary embodiment of the present invention.

FIG. 2 is a view showing an example of a circuit configuration of power supply system 1 for a vehicle according to an exemplary embodiment of the present invention. The difference of FIG. 2 compared with the general circuit configuration of FIG. 1 is mainly explained in the following. Current sensor CT1 and fuse F1 are inserted into the current path in which the plurality of power storage modules 11-14 are serially connected, at a position dividing the plurality of power storage modules 11-14 into a first group and a second group. In FIGS. 1 and 2, the first group includes first power storage module 11 and second power storage module 12, and the second group includes third power storage module 13 and fourth power storage module 14. Namely, current sensor CT1 and fuse F1 are inserted between second power storage module 12 and third power storage module 13.

In the circuit configuration of the exemplary embodiment shown in FIG. 2, positive-pole-side contactor RY1 is inserted at a position dividing the plurality of power storage modules belonging to the first group into two sub-groups. In this exemplary embodiment, positive-pole-side contactor RY1 is inserted between first power storage module 11 and second power storage module 12. Negative-pole-side contactor RY2 is inserted at a position dividing the plurality of power storage modules belonging to the second group into two sub-groups. In this exemplary embodiment, negative-pole-side contactor RY2 is inserted between third power storage module 13 and fourth power storage module 4.

Thus, positive-pole-side contactor RY1, fuse F1, negative-pole-side contactor RY2 are respectively inserted at positions dividing the plurality of power storage modules 11-14 into four sub-groups. Additionally, the position where current sensor CT1 is inserted, is not limited to between second power storage module 12 and third power storage module 13. Current sensor CT may be inserted at another position, as long as it is located within positive-pole-side contactor RY1, negative-pole-side contactor RY2.

Figure 3:
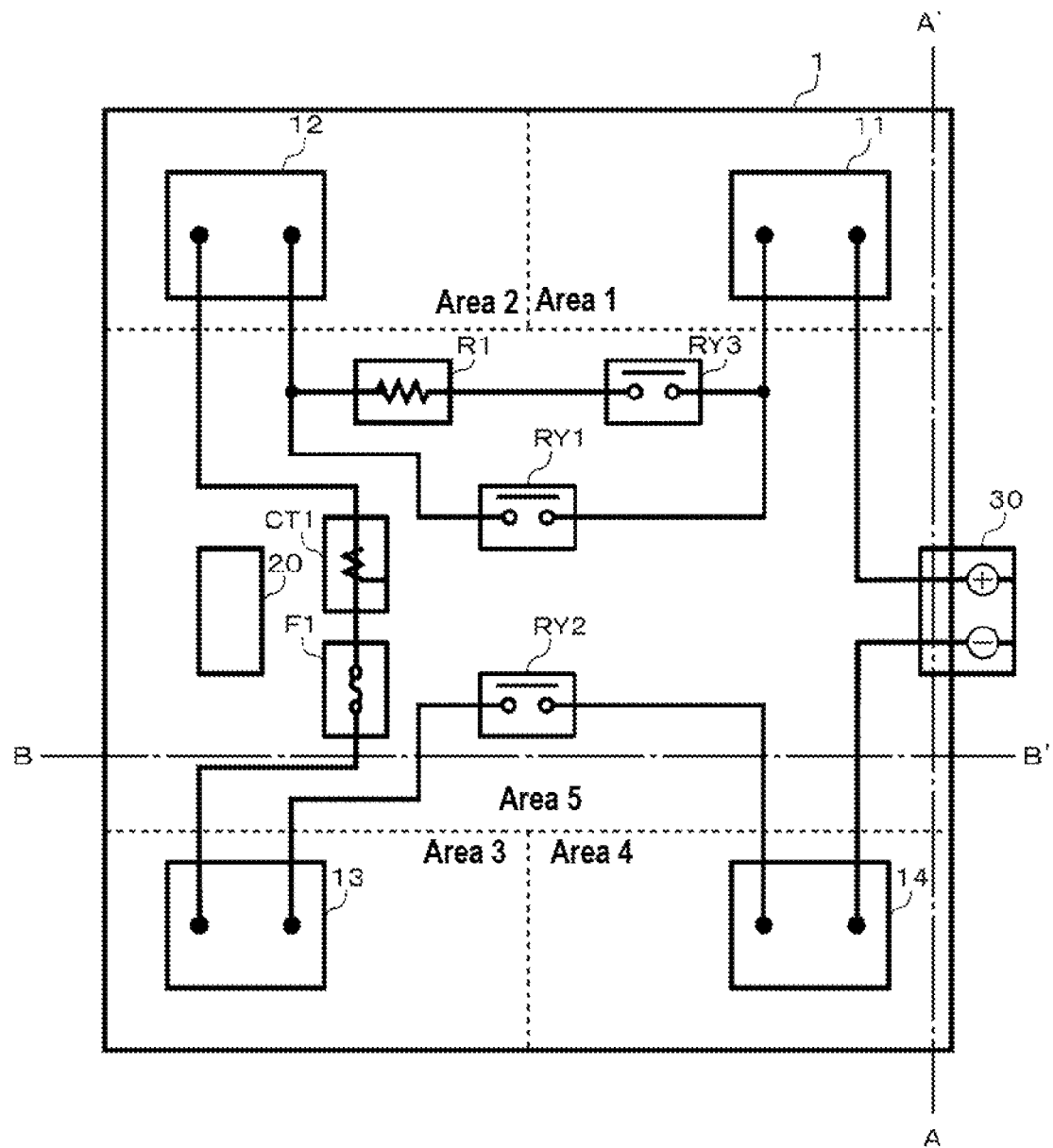
FIG. 3 is a schematic view from above of an arrangement of configuration elements within a housing in the power supply system of FIG. 2

FIG. 3 is a schematic view from above of an arrangement of configuration elements within a housing in power supply system 1 of FIG. 2 The inside of the housing is divided into five areas, and then partitions made of insulating material partition the housing into each of the five areas. The dotted lines of FIG. 3 indicate the partitions.

As shown in FIG. 3, first power storage module 11 is disposed at area 1 of the upper right side in FIG. 3, second power storage module 12 is disposed at area 2 of the upper left side in FIG. 3, third power storage module 13 is disposed at area 3 of the lower left side in FIG. 3, fourth power storage module 14 is disposed at area 4 of the lower right side in FIG. 3. A housing of each of power storage modules 11-14 is provided in a state where it is electrically insulated from the periphery. The usage for a vehicle requires the durability and robustness, a metal housing is often used for the housing of the power storage module. The metal housing which stores each of power storage modules 11-14 is provided in a state where it is insulated from the housings of the other power storage modules and the whole housing of power supply system 1.

Connector 30, control circuit 20, positive-pole-side contactor RY1, negative-pole-side contactor RY2, pre-charge contactor RY3, pre-charge resistor R1, current sensor CT1, and fuse F1, are disposed at central area 5.

Figure 4:
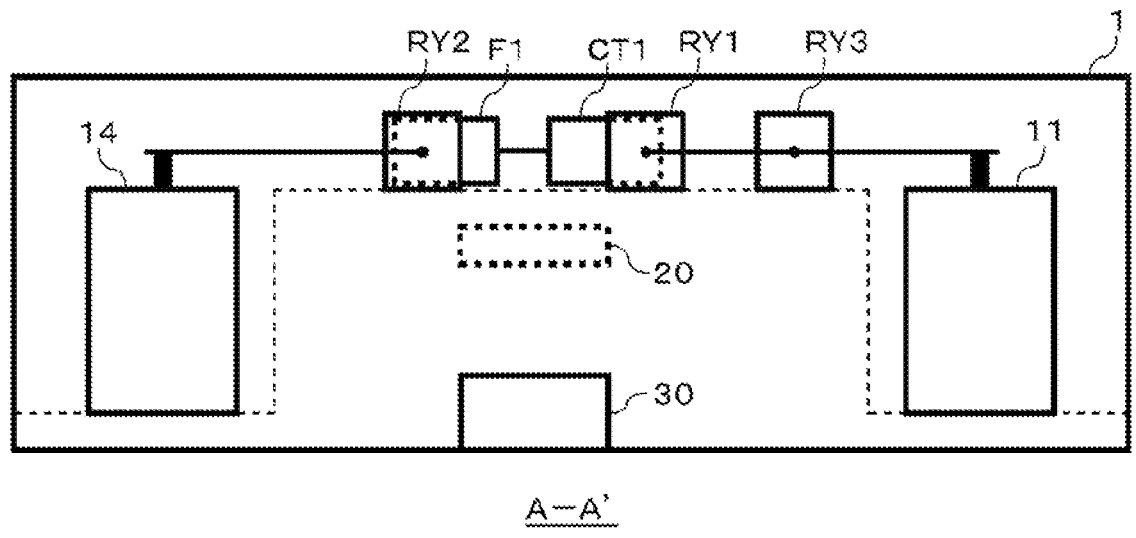
FIG. 4 is a schematic view from right side of a line A-A' section of FIG. 3.
Figure 5:
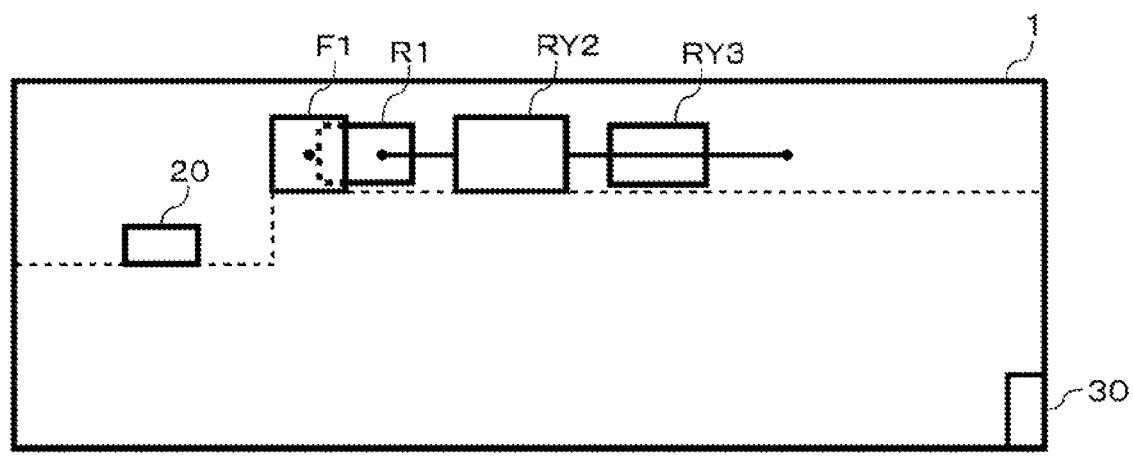
FIG. 5 is a schematic view from lower side of a line B-B' section of FIG. 3.

FIG. 4 is a schematic view from right side of a line A-A' section of FIG. 3. FIG. 5 is a schematic view from lower side of a line B-B' section of FIG. 3. As shown in FIGS. 4 and 5, connector 30 is disposed at the lowest portion of the housing. First power storage module 11, second power storage module 12, third power storage module 13, and fourth power storage module 14 are disposed by one stage higher than it. Control circuit 20 is disposed by one stage higher than it. Positive-pole-side contactor RY1, negative-pole-side contactor RY2, pre-charge contactor RY3, pre-charge resistor R1, current sensor CT1, and fuse F1, are disposed at the highest portion.

As shown in FIG. 4, areas 1-4 have the raised bottom by the predetermined length (for example, several centimeters). Area 5 has the raised bottom of the height substantially equal to a height of the upper surface of power storage modules 11-14. This raised bottom of area 5 has a function of the insulating walls between first power storage module 11 (and second power storage module 12) and third power storage module 13 (and fourth power storage module 14).

Positive terminals and negative terminals extend from the upper surfaces of power storage modules 11-14. According to the connecting relation of the circuit diagram shown in FIG. 2, each of the positive terminals and the negative terminals is connected to the terminal of the connection destination by bas-bars. In addition, the positive terminal of first power storage module 11 is connected to the positive terminal of connector 30 through the wire harness, and the negative terminal of fourth power storage module 14 is connected to the negative terminal of connector 30 through the wire harness. As shown in FIG. 5, the raised bottom of area 5 has a lowered portion by one stage, and control circuit 20 is disposed on the lowered portion.

In the example of the above-mentioned arrangement, procedures or measures will be explained, when power supply system 1 is submerged or immersed. First, connector 30 is submerged, and a part between the positive terminal and the negative terminal of connector 30 is short-circuited. Then, a large current flows between power storage modules 11-14, to blow out fuse F1. In this step, first power storage module 11 and second power storage module 12 are electrically separated from third power storage module 13 and fourth power storage module 14.

Next, the water level river rises, and control circuit 20 is partially submerged. Then, control circuit 20 opens (turns off) positive-pole-side contactor RY1 and negative-pole-side contactor RY2, caused by its detection of the circuit abnormality. In this step, first power storage module 11 is electrically separated from second power storage module 12, and third power storage module 13 is electrically separated from fourth power storage module 14. Namely, each of power storage modules 11-14 is electrically separated. In this step, the upper portion of power storage modules 11-14 is not submerged. Then, the positive terminals and the negative terminals of power storage modules 11-14 are not submerged. Additionally. the portion of the high voltage circuit in control circuit 20 is not submerged.

Further, the water level river rises, and all of power storage modules 11-14 are submerged. Then, cells within each of the power storage modules are short-circuited.

As explained above, in this exemplary embodiment, since connector 30, plurality of power storage modules 11-14, fuse F1, positive-pole-side contactor RY1, and negative-pole-side contactor RY2 are disposed in height difference, the occurrence order of the short-circuit due to the submergence can be controlled. Namely, since connector 30 is disposed at the position lower than the position of fuse F1, at the step where connector 30 is submerged, the state where fuse F1 is normally blown out is secured. Additionally, since control circuit 20 is disposed at the position lower than the position of positive-pole-side contactor RY1 and negative-pole-side contactor RY2, at the step where control circuit 20 is submerged, the state where positive-pole-side contactor RY1 and negative-pole-side contactor RY2 normally operate, secured.

Since control circuit 20 is disposed at the position higher than the position of connector 30, the cutoff of the current path by positive-pole-side contactor RY1 and negative-pole-side contactor RY2 can be carried out, temporally after the cutoff of the current path by fuse F1 is carried out. In contrast, timings of both cutoffs are the same, the transient current becomes large. However, in this exemplary embodiment, the timings of both cutoffs are different in time, the transient current can be suppressed to a small value.

Normally, connector 30 is submerged in advance. Then, when the submergence to power supply system 1 stops in a state where connector 30 is submerged (the rising of the water level stops), control circuit 20 is not submerged. In this case, it is not necessary to change control circuit 20, and fuse F1 and connector 30 are changed for new ones. Therefore, the repair cost can be suppressed to a low value. In addition, since control circuit 20 is not changed, the work of changing its wiring does not occur.

Positive-pole-side contactor RY1, fuse F1, negative-pole-side contactor RY2 are respectively disposed so as to divide the plurality of power storage modules 11-14 into four equal sub-groups. Therefore, voltages applied between the cells can be decreased at a time of cell short-circuit. Positive-pole-side contactor RY1, fuse F1, negative-pole-side contactor RY2 are the generally used elements, and are not newly added elements. Therefore, the cost increase and the circuit enlargement due to addition of a new element do not occur. By changing the arrangement of positive-pole-side contactor RY1, fuse F1, and negative-pole-side contactor RY2, the maximum voltage applied to the cells can be decreased to substantially one fourth at a time of cell short-circuit by the submergence. Therefore, while safety is secured, a specification of a withstand voltage structure in the cells can be suppressed to a low cost one.

The power storage module which is covered with the metal housing, is disposed in a state where it is electrically insulated from the housings of the other power storage modules and the housing of the system. Therefore, voltages applied between the cells which are short-circuited through the metal housings, can be decreased. Additionally, when an insulating member is sandwiched between the metal housing and a battery can which stores the cell, or a distance between the metal housing and the battery can is increased, voltages applied between the cells which are short-circuited through the metal housings, can be also decreased. By carrying out these measures, the safety against the submergence can be increased further.

The present invention has been described based on the exemplary embodiment. A person of the ordinary skill in the art can understand that the exemplary embodiment is illustrative only, constitution elements and combined processes can be modified, and such modified examples are covered by the scope of the present invention.

In the above-mentioned exemplary embodiment, the number of the plurality of the power storage modules connected in series, is 4. However, the number of 5 or more pieces is applicable. For example, when the number of the plurality of the power storage modules is 8, positive-pole-side contactor RY1, fuse F1, and negative-pole-side contactor RY2 are respectively inserted at positions dividing the power storage modules into a two-piece pair each. Further, when the number of the plurality of the power storage modules is 6, positive-pole-side contactor RY1, fuse F1, and negative-pole-side contactor RY2 are respectively inserted at positions dividing the power storage modules into two, one, two, one pieces. Further, when the number of the plurality of the power storage modules is 7, positive-pole-side contactor RY1, fuse F1, and negative-pole-side contactor RY2 are respectively inserted at positions dividing the power storage modules into two, two, two, one pieces.

In the above-mentioned exemplary embodiment, control circuit 20 is disposed at the position lower than the position of positive-pole-side contactor RY1 and negative-pole-side contactor RY2, by one stage. However, by disposing a submergence sensor at this position, control circuit 20 may be disposed at a position of the same height as positive-pole-side contactor RY1 and negative-pole-side contactor RY2. When this submergence sensor detects the submergence, it outputs a detection signal to control circuit 20. Then, when control circuit 20 receives this detection signal, it opens positive-pole-side contactor RY1 and negative-pole-side contactor RY2.

In the above-mentioned exemplary embodiment, the example is assumed that power supply system 1 is used for a power source device for vehicles. However, the power storage system is not limited to use for vehicles, and then can be used as the power source device for airplanes, for ships, for stationary types, or for other uses.

The exemplary embodiment may be specified by items described below.

[Item 1]

A power supply system (1) including:
- a plurality of power storage modules (11-14) that are connected in series:
- a fuse (F1) that is inserted into a path in which the plurality of power storage modules (11-14) are serially connected, at a position dividing the plurality of power storage modules (11-14) into a first group and a second group;
- a positive-pole-side contactor (RY1) that is inserted at a position dividing the plurality of power storage modules (11 12) belonging to the first group into a first sub-group and a second sub-group; and
- a negative-pole-side contactor (RY2) that is inserted at a position dividing the plurality of power storage modules (13, 14) belonging to the second group into a first sub-group and a second sub-group.

Accordingly, voltages applied between the cells can be decreased at a time of cell short-circuit due to the submergence.

[Item 2]

The power supply system (1) according to item 1,
wherein the positive-pole-side contactor (RY1), the fuse (F1), and the negative-pole-side contactor (RY2) are respectively inserted at positions dividing the plurality of power storage modules (11-14) into substantially equal four parts.

Accordingly, the maximum voltage applied between the cells can be decreased to substantially one fourth at a time of cell short-circuit due to the submergence.

[Item 3]

The power supply system (1) according to item 1 or 2,
further comprising a connector (30) that connects both ends of the plurality of power storage modules (11-14) to an outer load (3),
wherein the connector (30) is disposed at a position lower than a position of the fuse (F1), in the prescribed disposed state of the power supply system (1).

Accordingly, at a time when connector (30) is submerged, the state where the fuse (F1) is normally blown out is secured.

[Item 4]

The power supply system (1) according to item 3,
further comprising a control circuit (20) for controlling the positive-pole-side contactor (RY1) and the negative-pole-side contactor (RY2),
wherein the connector (30), the control circuit (20), the fuse (F1), the positive-pole-side contactor (RY1), and the negative-pole-side contactor (RY2) are disposed, such that the connector (30) is disposed at a lowest position among them, and the control circuit (20) is disposed at a second lowest position, and the fuse (F1), the positive-pole-side contactor (RY1), and the negative-pole-side contactor (RY2) are disposed at a highest position among them, in the prescribed disposed state of the power supply system (1).

Accordingly, the blowing-off timing of the fuse (F1), the opening timing of the positive-pole-side contactor (RY1) and the negative-pole-side contactor (RY2), occur with a time difference.

[Item 5]

The power supply system (1) according to item 4,
wherein each of the plurality of power storage modules (11-14) has terminals at a upper surface of each of the plurality of power storage modules, in the prescribed disposed state of the power supply system (1), and
the fuse (F1), the positive-pole-side contactor (RY1), and the negative-pole-side contactor (RY2) are disposed at a position substantially horizontal to the terminals of the plurality of power storage modules (11-14).

Accordingly, the submergence of the terminals of the plurality of power storage modules (11-14), the fuse (F1), the positive-pole-side contactor (RY1), and the negative-pole-side contactor (RY2) are delayed, the cutoff structures of the fuse (F1), the positive-pole-side contactor (RY1), and the negative-pole-side contactor (RY2) can be kept in a normal state for a long time after starting of the submergence.

The invention claimed is:

1. A power supply system comprising:
a plurality of power storage modules that are connected in series:
a fuse that is inserted into a path in which the plurality of power storage modules are serially connected, at a position dividing the plurality of power storage modules into a first group and a second group;
a positive-pole-side contactor that is inserted at a position dividing the plurality of power storage modules belonging to the first group into a first sub-group and a second sub-group; and
a negative-pole-side contactor that is inserted at a position dividing the plurality of power storage modules belonging to the second group into a first sub-group and a second sub-group;
further comprising a connector that connects both ends of the plurality of power storage modules to an outer load,
wherein the connector is disposed at a position lower than a position of the fuse,
further comprising a control circuit for controlling the positive-pole-side contactor and the negative-pole-side contactor,
wherein the connector, the control circuit, the fuse, the positive-pole-side contactor, and the negative-pole-side contactor are disposed, such that the connector is disposed at a lowest position among them, and the control circuit is disposed at a second lowest position, and the fuse, the positive-pole-side contactor, and the negative-pole-side contactor are disposed at a highest position among them.

2. The power supply system according to claim 1,
wherein the positive-pole-side contactor, the fuse, and the negative-pole-side contactor are respectively inserted at positions dividing the plurality of power storage modules into substantially equal four parts.

3. The power supply system according to claim 1,
wherein each of the plurality of power storage modules has terminals at a upper surface of each of the plurality of power storage modules, and
the fuse, the positive-pole-side contactor, and the negative-pole-side contactor are disposed at a position substantially horizontal to the terminals of the plurality of power storage modules.

* * * * *